United States Patent [19]
Hulslander et al.

[11] 3,765,646
[45] Oct. 16, 1973

[54] PLUG VALVE SEAL

[75] Inventors: William L. Hulslander; Gerald L. Anderson; Charles J. Glover, all of Bradford, Pa.

[73] Assignee: Dresser Industries, Inc., Dallas, Tex.

[22] Filed: Feb. 18, 1972

[21] Appl. No.: 227,475

[52] U.S. Cl. .................................. 251/183, 251/317
[51] Int. Cl. .............................................. F16k 5/02
[58] Field of Search .................... 251/163, 183, 185, 251/317

[56] References Cited
UNITED STATES PATENTS

| | | | |
|---|---|---|---|
| 3,504,886 | 4/1970 | Hulslander et al. | 251/184 |
| 3,647,181 | 3/1972 | Hulslander | 251/317 |
| 3,395,889 | 8/1968 | Chovan | 251/183 X |
| 2,505,998 | 5/1950 | Sleeper et al. | 251/163 |
| 2,295,862 | 9/1942 | Ohls | 251/163 |

Primary Examiner—William R. Cline
Attorney—Robert W. Mayer et al.

[57] ABSTRACT

A floating closure seal usable in conjunction with a tapered plug in the conical well of a plug valve body. Forming the seal is an elastomeric composition generally enclosing an arcuate span of a relatively thin, flexible base material. On the backside facing a recess in the supporting plug, the seal includes localized elastomeric projections engaging the recess wall. The projections act to distend the seal on its front side into diametral conformity with the proximate body well surface for effecting a sealing relation therewith.

16 Claims, 10 Drawing Figures

Patented Oct. 16, 1973  3,765,646

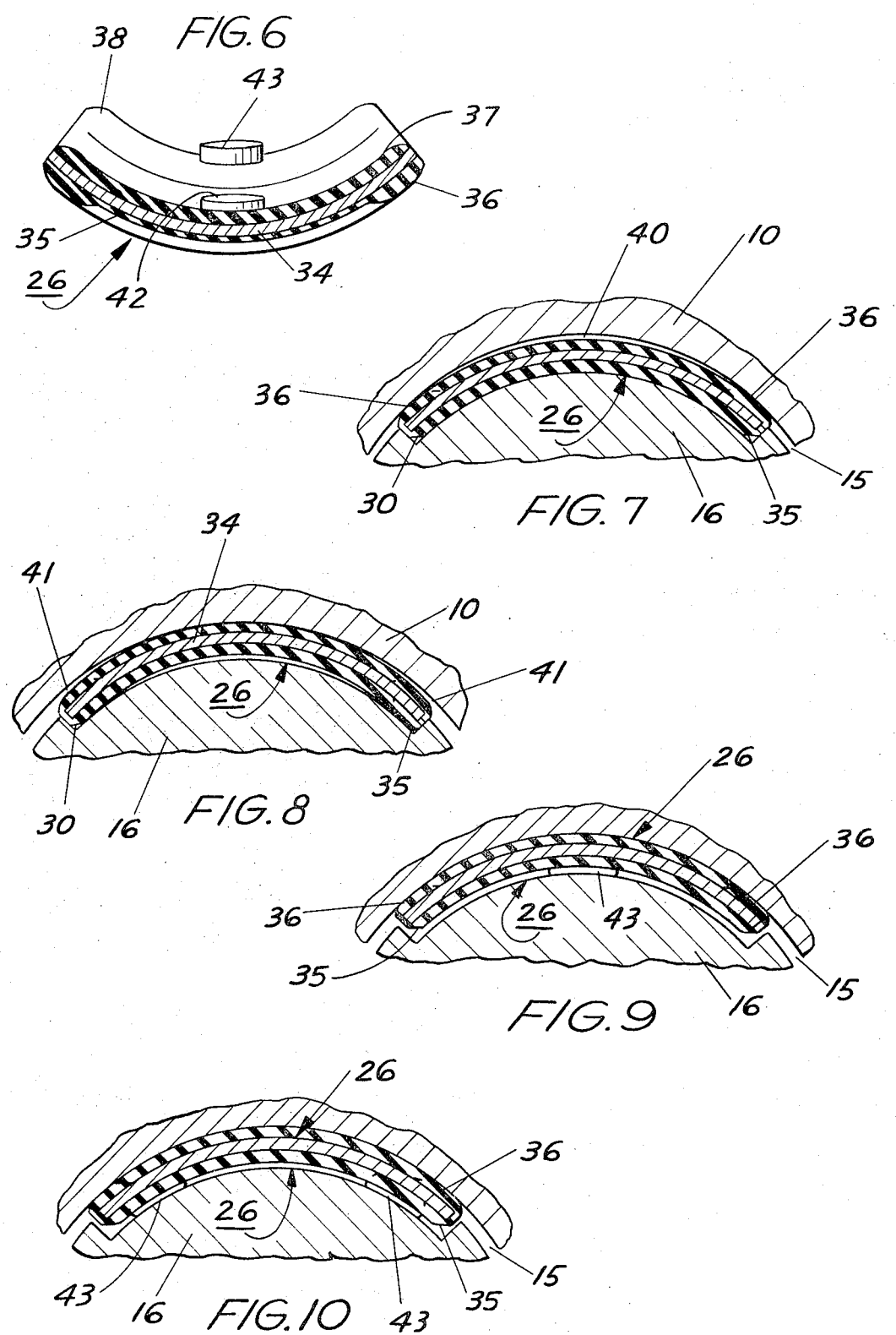

PLUG VALVE SEAL

CROSS-REFERENCE TO RELATED APPLICATIONS

Application Ser. No. 20,471 filed Mar. 25, 1970, for "Valve with Controlled Seal Deflection," now U. S. Pat. No. 3,647,181.

BACKGROUND OF THE INVENTION

*a.* The art to which the invention pertains includes the art of valves utilized in a piping system for controlling the flow passage to effect flow shutoff of fluid line contents. More particularly it pertains to gaskets and seals employed in such valves to ensure against leakage between the valve elements effecting shutoff.

*b.* Plug valves having a tapered plug rotatably operable in a conical body well are well known in the art. A commercial form of such valves employing a floating closure seal interposed between the rotatable plug and well wall is disclosed in U. S. Pat. No. 3,360,236. Typically, a biasing member such as a spring or the like urges the plug axially downward into the well in order to obtain a close conical interfit between components for effecting operation in the manner intended.

The closure seals, as well as the plug, are manufactured as separate components for positioned placement in the assembled valve. By maintaining close manufacturing tolerances over the body well, plug and seals it has been the practice to dimensionally match their diametral fits at the intended axial location of the assembled parts. With a successful coincident match the seal surface diameter arcuately corresponds to the proximate well diameter against which it engages for effecting a sealing relation able to prevent leakage when the plug is positioned for shutoff. Should, however, any axial displacement or mismatch be incurred, the seal to well surface engagement instead of coinciding, occurs between arcuate sections of different incompatible diameters. In the latter event, imperfect engagement results to reduce effectiveness of the sealing relation to the point of not being able to effect leaktight shutoff of the valve.

Perfect component matching essentially presupposes an ultimate assembly produced without manufacturing tolerance variations in order to preclude the aforementioned axial displacement that would otherwise result. Manufacturing on a production basis without tolerances is, of course, cost prohibitive, as a consequence of which, diametral mismatching in these valves occurs with a relatively high degree of frequency. In order to tolerate this situation, considerable post assembly testing has been required in conjunction with a high level of quality control to ensure shutoff at rated pressure capacity of the valve. Despite recognition of the problem, a simple, inexpensive and effective solution has not heretofore been known.

SUMMARY

This invention relates to plug valves and specifically to a closure seal member therefor. More particularly, the invention relates to a floating closure seal construction for use in such valves intervening between a tapered plug and the conical well bore of the valve body to enhance sealing against leakage when the valve is in its shutoff position. By means of a closure seal constructed in accordance with the invention, prior sealing difficulties associated with axially mismatched displacement between the seal and bore wall is substantially, if not completely, eliminated as to dispense with the previous closely adhered tolerance and testing requirements. Pursuant hereto, the adverse effects of mismatch that might otherwise occur are overcome to accommodate difference in diameters by simply distorting or deflecting the seal into arcuate conformity with the proximate bore surface against which it engages for sealing.

The foregoing result in accordance with the invention is achieved by a closure seal formed of a thin, arcuately shaped, flexible base coated with an elastomeric sealing composition radially beaded about the base periphery. Elastomeric projections are locally positioned on the backside of the seal facing a supporting recess in the plug. The projections are adapted to engage against the recessed plug surface to distort or deflect the seal radially outward into a conforming diametral sealing engagement with the bore wall surface diameter thereat. Whereever a mismatch is encountered, the projections effect a distortionally responsive compensation to the flexible sealing member sufficient to ensure continuously contiguous sealing engagement therebetween. By virtue therefore of an otherwise minor feature in the form of elastomeric projections, the previous problems associated with axial mismatch are simply and inexpensively overcome in resolving a prior difficulty long plaguing the industry.

It is therefore an object of the invention to provide a novel closure seal construction for a plug valve.

It is a further object of the invention to provide a novel plug valve closure seal construction insensitive to diametral differences occasioned by axial mismatch between corresponding sealing surfaces of the seal and bore wall.

It is a further object of the invention to provide a novel plug valve closure seal of an integrally flexible construction that is distortionally responsive to a radially applied biasing force for diametrally conforming with the proximate bore surface against which it engages for sealing.

It is a still further object of the invention to provide a novel closure seal construction as in the aforementioned objects that is simple, inexpensive to manufacture and yet highly effective in eliminating the sealing problem previously associated with axial mismatching in similar purpose plug valve closure seals of the prior art.

BRIEF DESCRIPTION OF THE DRAWINGS

FIG. 6 is a section as viewed substantially along the lines 6—6 of FIG. 3;

FIGS. 7 and 8 are sections viewed along the lines A—A of FIG. 2 in accordance with the prior art; and FIGS. 9 and 10 are corresponding sections viewed along the lines A—A of FIG. 2 in accordance with the invention.

Figure 1:
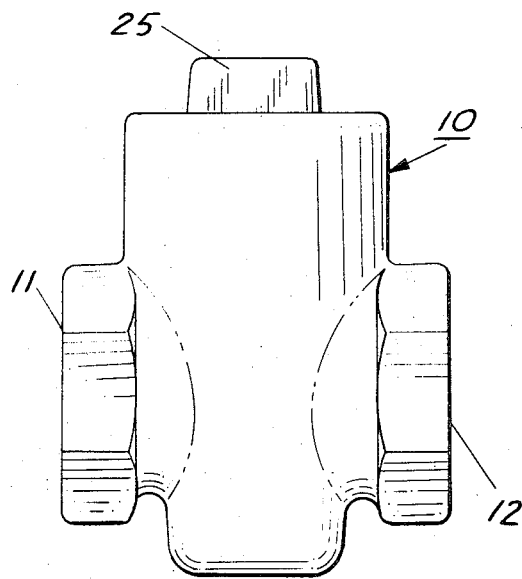
FIG. 1 is a front exterior elevation of a plug valve in which the closure seal element of the invention is contained.
Figure 2:
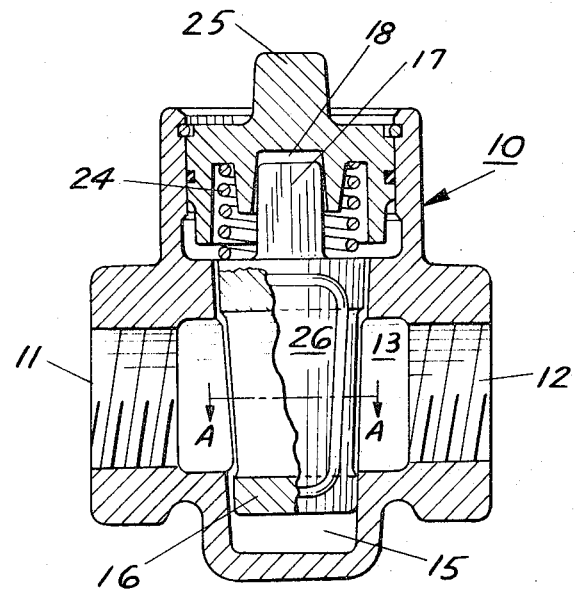
FIG. 2 is a sectional elevation through the plug valve of FIG. 1.
Figure 3:
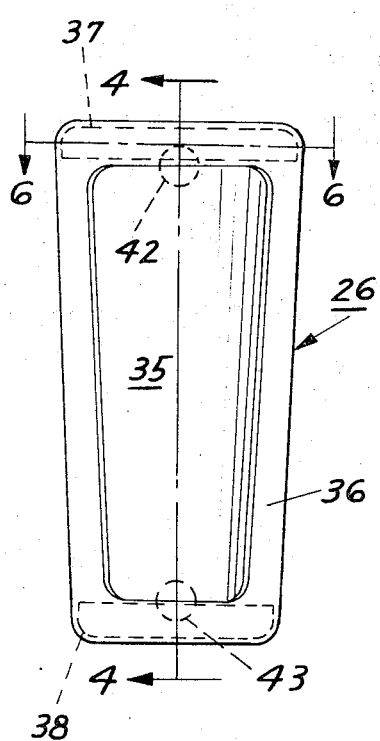
FIG. 3 is a front elevation of a closure seal in accordance herewith.
Figure 4:
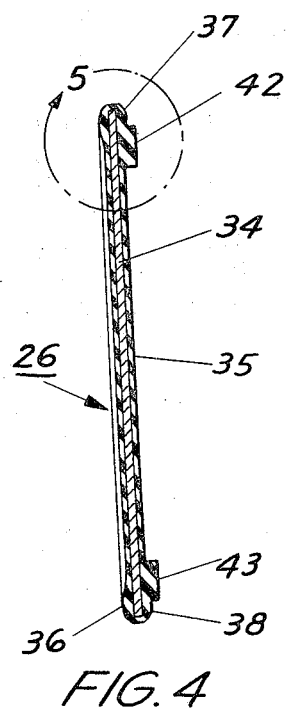
FIG. 4 is a sectional elevation taken substantially along the lines 4—4 of FIG. 3.
Figure 5:
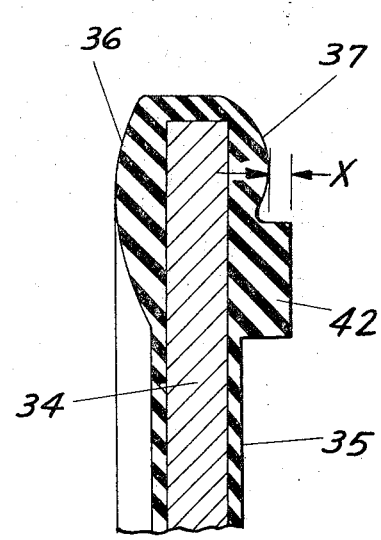
FIG. 5 is a fragmentary enlargement of the encircular portion of FIG. 4.

Reference is now made to the drawings, and particularly to FIGS. 1 and 2 in which there is illustrated a plug valve of a type generally disclosed in U. S. Pat. No. 3,360,236. Briefly, the valve is comprised of a cast body or casing designated 10 having an inlet 11 and outlet 12 for mounting into a pipeline in which the valve is to be utilized. Connecting the inlet and outlet ports is flow passage 13 interrupted at an intermediate location by a transversely extending conical well bore 15. Received in the bore for operable rotation therein is a thruport slotted tapered plug 16.

Extending axially integral and upward from the plug is a shank 17 of noncircular cross-section received internally of a complementary central socket 18 of a rotatable operating member 19. The operating member is in turn axially secured within body 10 in a manner compressing spring 24 coiled about shank 17 to urge plug 16 axially downward into well bore 15. An exposed wrench engaging shank 25 enables rotation of member 19 for operating the plug between the open and shutoff positions of the valve.

For sealing the valve in a shutoff position there is provided a pair of oppositely positioned closure elements or seals 26 in accordance herewith as will be described with particular reference to FIGS. 3 – 10. Each closure seal 26 comprises a thin, arcuate, flexible base or substrate material 34, such as steel, on the order of about 1/16 inches in thickness supporting a coating of elastomeric sealing material 35. In a preferred embodiment, sealing material 35 comprises a coating of polyurethane molybdenumdisulphide composition, which may be of a type disclosed in U. S. Pat. No. 3,504,886. The coating is usually less than about 1/32 inches thick over each face of base 34. About the front peripheral edge the coating is formed as an endless radially extending bead 36 that serves to fill voids or other surface irregularities in the well bore. On the backside extending transversely to the longitudinal axis of the seal for the purpose of stabilization there is provided radially extending top and bottom beads 37 and 38. In use, the seal is supported within a recess 30 of the plug with which it moves during rotational operation of the latter. While the dimensional characteristics of seal 26 will vary with the application of use, it is important to have a combined thickness somewhat in excess of the clearance between the plug and well bore wall to ensure remaining in recess 30 during plug rotation.

With plug 16 in shutoff position, one of the closure seals 26 is positioned opposite inlet 11 while the other closure seal is positioned opposite outlet 12, it being understood that the inlet and outlet are readily interchangeable. Pressure from fluid at the inlet will, if of sufficient magnitude, press sealing material 35 into recess 30 permitting fluid flow past the seal to interior of the well behind the other closure element. Fluid pressure behind the latter, aided by the lateral force component from spring 24, normally acts to force bead 36 against ridges of the outlet port for effecting the intended sealing relation.

When seal 26 in assembly achieves its ultimately intended axially aligned match with bore wall 15, continuous coincident engagement results between the front surface of seal 26 and the proximate surface of the bore wall. Should, however, axial mismatch be encountered, less than complete sealing engagement results. This can be best understood by reference to the prior art constructions illustrated in FIGS. 7 and 8. In FIG. 7, the condition is illustrated in which a plug 16, with a prior art closure element, extends into the well bore axially beyond the intended match point. Under these circumstances, the encountered engagement is between the larger convex radius of the closure element represented by bead 36 and a smaller concave radius of the proximate wall surface thereat. The effect of the diametral difference is an axially central gap or separation 40 between the two through which leakage can readily occur. Contra, axial plug penetration to a lesser axial extent than intended results in an encountered engagement between a smaller convex closure radius of bead 36 than that of the proximate concave wall surface producing a peripheral gap 41 in the vicinity of the side edges best illustrated in FIG. 8. In either event, inadequate sealing is obtained, the degree of which varies as a function of the incurred axial displacement encountered on a unit by unit basis.

Elimination of the prior leakage gap, in accordance with the invention, is achieved by means of a balance loaded, bias force applied to the backside of the closure element by elastomers at locations generally opposite the vicinity at which the leakage gap would otherwise occur. While various forms of spring loading could be utilized for the purpose of affording the desired bias force, in a preferred embodiment it is achieved by a pair of elastomeric buttons comprising an upper botton 42 and a lower button 43 integrally molded of sealing composition 35. This construction not only simplifies manufacture, but affords permanent attachment at predetermined locations for enhancing subsequent assembly. As compared to a spring, biasing force of the elastomer is more nearly proportional for effecting required seal distortion. At the same time, use of the same elastomer offers a material consistently compatible with line content while contributing well known elastomeric characteristics of polyurethane for achieving the intended result.

Enhanced sealing afforded by the buttons can be best understood by contrasting FIGS. 7 and 9 for an otherwise comparable mismatch situation producing a leakage gap 40 in the former. By contrast, buttons 42 and 43 in the latter act to centrally distend or deflect the closure elements forward into contiguously endless sealing engagement against the well bore surface. An analagous mismatch relation can be understood by contrasting FIGS. 8 and 10 for elimination of gap 41. For the latter circumstances, a pair of buttons 42 and 43 is duplicated near each arcuate end of the seal. As before, the buttons are balance loaded and opposite the vicinity at which separation leakage gap 41 previously occurred. Either of the foregoing button arrangements can be anticipated in advance of valve assembly for the situation to be encountered, and in any event both are completely effective for eliminating the previous leakage problem associated with prior art closure seal mismatch of the type described.

Dimensions of the elastomeric buttons are, of course, selected as a function of its inherent material characteristics for producing the biasing forces compatible with the more general flexibility characteristics of closure element 26. In a preferred embodiment for the element and valve being described, buttons 42 and 43 are each on the order of 5/32 inches in diameter. Likewise, each are of a radial depth greater than the radial depth of rear beads 37 and 38, a dimension "X" in an amount of about 1/32 inches plus, approximating twice the radial depth of the adjacent rear beads.

By the above description there has been disclosed a novel sealing element for eliminating the previous mismatch leakage problems associated with plug valves utilizing tapered plugs for opening and closing of the valve. By a simple, yet highly effective construction, the previous leakage problems long plaguing the industry have been resolved in a highly economic manner.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a plug valve including a body defining a fluid passage between ports for the inlet and outlet of fluid flow and a frusto-conical well bore extending transversely into said passage, and a tapered plug received within said well bore for rotatable movement from a first position in which said passage is open between said ports to a second position in which said passage is closed between said ports, the improvement comprising a closure seal supported interposed between said plut and the wall of said well bore to provide a fluid seal thereat when said plug is in said second position, said closure seal comprising:
   a. a flexible base of predetermined arcuate span and of a shaped length adapted to extend generally parallel to the frusto-conical surface of said plug;
   b. an elastomeric seal composition supported on the front face of said base extending radially outward toward said well bore wall; and
   c. at least a pair of spaced apart localized biasing means operatively compressed between the rear face of said base and the plug surface thereat,
   d. said biasing means being located for operative effectiveness to deflect said seal into diametral conformity with the proximate well bore surface for effecting a seal engaging relation therewith.

2. The improvement according to claim 1 in which said biasing means is an elastomer.

3. The improvement according to claim 2 in which said biasing means is comprised of button-like radial projections securely attached to the rear face of said base.

4. The improvement according to claim 3 in which said projections are located longitudinally aligned opposite the vicinity at which an assembled diametral difference between said seal engaging surfaces would result in a leakage gap intervening between said surfaces in the absence of said seal deflection.

5. The improvement according to claim 4 including at least two pair of said projections.

6. The improvement according to claim 4 including said seal composition being also supported on said rear face of said base and in which said projections are integral with the seal composition on said rear face.

7. The improvement according to claim 6 in which said seal and said projections are of the same elastomeric composition.

8. The improvement according to claim 7 in which said elastomeric composition comprises polyurethane molybdenum-disulphide.

9. A closure seal to be contained in plug valve intermediate a rotatable frusto-conical plug and a conical body well in which the plug is received, said seal comprising in combination:
   a. a flexible base of predetermined arcuate span and of a shaped length adapted to extend generally parallel to the frusto-conical surface of said plug;
   b. an elastomeric seal composition supported on the radially outer face of said base extending radially outward therefrom; and
   c. at least a pair of spaced apart localized biasing means on the radially inner face of said base adapted to be operatively compressed against a plug surface thereat,
   d. said biasing means being located for operative effectiveness when the seal is in said intermediate position to deflect said seal into diametral conformity with the proximate well bore surface for effecting a seal engaging relation therewith.

10. A closure seal according to claim 9 in which said biasing means is an elastomer.

11. A closure seal according to claim 10 in which said biasing means is comprised of button-like radial projections securely attached to the rear face of said base.

12. A closure seal according to claim 11 in which said projections are located longitudinally aligned opposite the vicinity at which an assembled diametral difference between said seal engaging surfaces would result in a leakage gap intervening between said surfaces in the absence of said seal deflection.

13. A closure seal according to claim 12 including at least two pair of said projections.

14. A closure seal according to claim 12 including said seal composition being also supported on said radially inner face of said base and in which said projections are integral with the seal composition on said radially inner face.

15. A closure seal according to claim 14 in which said seal and said projections are of the same elastomeric composition.

16. A closure seal according to claim 15 in which said elastomeric composition comprises polyurethane molybdenum-disulphide.

* * * * *